US008825637B1

(12) United States Patent
Schneider et al.

(10) Patent No.: US 8,825,637 B1
(45) Date of Patent: *Sep. 2, 2014

(54) RECORDING USER ACTIONS

(75) Inventors: Fritz Schneider, San Francisco, CA (US); Dylan Parker, Palo Alto, CA (US); Paul Buchheit, Mountain View, CA (US); Nikhil Bhatla, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,374

(22) Filed: Sep. 14, 2012

Related U.S. Application Data

(63) Continuation of application No. 10/744,771, filed on Dec. 22, 2003, now Pat. No. 8,433,703.

(51) Int. Cl.
G06F 17/30 (2006.01)
(52) U.S. Cl.
USPC ............................................ 707/722; 707/758
(58) Field of Classification Search
None
See application file for complete search history.

(56) References Cited

U.S. PATENT DOCUMENTS

| | | | |
|---|---|---|---|
| 6,873,982 B1 * | 3/2005 | Bates et al. | 707/737 |
| 2002/0113818 A1 | 8/2002 | Tsuda | |
| 2003/0140121 A1 * | 7/2003 | Adams | 709/219 |
| 2003/0208482 A1 | 11/2003 | Kim et al. | |
| 2004/0098154 A1 * | 5/2004 | McCarthy | 700/97 |
| 2004/0205514 A1 | 10/2004 | Sommerer | |
| 2005/0125376 A1 | 6/2005 | Curtis et al. | |
| 2005/0256766 A1 * | 11/2005 | Garcia et al. | 705/14 |
| 2006/0123038 A1 | 6/2006 | Fenton et al. | |
| 2006/0253434 A1 | 11/2006 | Beriker et al. | |

OTHER PUBLICATIONS

Google News, messages 1-15, Nov. 20, 2003, 5 pgs.
Google News, messages 16-20, Nov. 20, 2003, 3 pgs.
Netflix Source Code, Apr. 12, 2004, 10 pgs.
Rate Movies, Apr. 12, 2004, 2 pgs.
Stealth Browser-Server Conversations, undated, 4 pgs.
Windows 95 Manual, 1998, 10 pgs.
XML-RPC JavaScript Message Builder, Aug. 20, 2001, 6 pgs.

* cited by examiner

*Primary Examiner* — Son T Hoang
(74) *Attorney, Agent, or Firm* — Morgan, Lewis & Bockius LLP

(57) ABSTRACT

A method for providing search results includes identifying a plurality of websites relevant to a search query, generating an ordered set of search results, and sending the search results to a client device. Each respective search result includes a link to a respective website, the link including a reference to a recording function that is distinct from a function of the link to send a request to the respective website, and position information identifying a position of the respective search result in the ordered set of search results. In some implementations, the search results also include the recording function. The recording function, when executed at the client device, sends data, including the position information and website location information associated with the link in a respective search result of the ordered set of search results, to a server that is distinct from the website.

15 Claims, 4 Drawing Sheets

RECORDING USER ACTIONS

RELATED APPLICATIONS

This application is a continuation of U.S. patent application Ser. No. 10/744,771, filed Dec. 22, 2003 now U.S. Pat. No. 8,433,703, which is hereby incorporated by reference in its entirety.

TECHNICAL FIELD

The present invention relates generally to Internet technology, and more particularly, to recording which websites a user visits.

BACKGROUND OF THE INVENTION

Internet search engines allow a user to more efficiently locate desired websites on the Internet. In response to a search query received from a user, a search engine provides the user with search results containing a list of websites responsive to the search query. Typically, a brief description of each website is provided along with a hypertext link (hereinafter "link") that the user clicks on to be directed to the corresponding website.

As the number of websites accessible through the Internet continues to increase, the manner in which websites are returned from a search query becomes increasingly important. For example, a common search query may return thousands of websites in which significant sites may be buried. Thus, the order in which websites are displayed within a search result is very important to enable a user to quickly identify the most relevant websites.

The order in which websites are displayed may be improved by monitoring which websites, within a particular search result set, are clicked by a user. By monitoring which websites the user clicks, the search engine can use this information as one factor in determining the order of various websites within the search results. Websites that receive a lot of clicks (or "hits") are likely more relevant to a particular search query than websites that the user does not click. Thus, these websites can be moved up in the order of returned search results so that the user can locate relevant websites more quickly.

One problem with current methods for recording user clicks is that the methods introduce additional latency which negatively impacts on the user's experience. For example, some search engines record user clicks by redirecting the user through the search engine's server to the server containing the requested website. In this scheme, each link in the search results includes a Uniform Resource Locator (URL) that points to the search engine's server. The URL for the website associated with the link is typically appended to the end of the search engine URL.

When a user clicks on the link, a request is sent to the search engine's server. The search engine receives the request, logs the URL associated with the website, and then redirects the request to the URL associated with the requested website. The server containing the requested website receives the request and sends the website data to the user's computer. This process of redirecting the user through the search engine server introduces an additional round trip to the load time for a website request. This additional round trip typically increases the latency experienced by the user by approximately 100 ms or more. This added latency is noticeable to the user and thus negatively impacts upon the user's experience.

What is needed is an improved method for recording user clicks that reduces the amount of latency experienced by the user.

SUMMARY

A method for providing search results to a user in response to a search query includes identifying a plurality of websites relevant to the search query, generating search results, and sending the search results to the client device. The search results include an ordered set of search results, each respective search result including a link to a respective website of the identified plurality of websites, the link including a reference to a recording function that is distinct from a function of the link to send a request to the respective website and that is executable at a client device when the user performs a predefined action with respect to the link, and position information identifying a position of the respective search result in the ordered set of search results. In some implementations, the search results also include the recording function. The recording function, when executed at the client device, sends data, including the position information and website location information associated with the link in a respective search result of the ordered set of search results, to a server that is distinct from the website.

In another aspect, An apparatus for generating search results in response to a search query includes one or more processors and memory storing programs for execution by the one or more processors. The programs include a search results generator for identifying a plurality of websites relevant to the search query, and a source code generator for generating an ordered set of search results. Each respective search result includes a link to a respective website of the identified plurality of websites, the link including a reference to a recording function that is distinct from a function of the link to send a request to the respective website and that is executable at a client device when the user performs a predefined action with respect to the link, and position information identifying a position of the respective search result in the ordered set of search results. In some implementations, the search results also include the recording function. The recording function, when executed at the client device, sends data, including the position information and website location information associated with the link in a respective search result of the ordered set of search results, to a server that is distinct from the website.

BRIEF DESCRIPTION OF THE DRAWINGS

Reference will be made to embodiments, examples of which may be illustrated in the accompanying figures. These figures are intended to be illustrative, not limiting. Although the invention is generally described in the context of these embodiments, it should be understood that it is not intended to limit the scope of the claims to these particular embodiments.

DETAILED DESCRIPTION OF THE PREFERRED EMBODIMENTS

A system and method for reducing the latency introduced by recording user actions that initiate a request for data associated with a link is described. In particular, a function is associated with each link in a list of websites displayed to a user. In response to a predefined user action with respect to the link, this function initiates a data transfer to a recording server, the data transfer including click recording data associated with the link.

In the following description, for purposes of explanation, specific details are set forth in order to provide an understanding of various embodiments. It will be apparent, however, to one skilled in the art that other embodiments can be implemented without these details. Furthermore, one skilled in the art will recognize that the embodiments described below may be incorporated in a number of different networking devices such as software, hardware or firmware. Accordingly, structures and devices shown below in block diagram are illustrative of specific embodiments are meant to avoid obscuring the invention.

Reference in the specification to "one embodiment," or "an embodiment" means that a particular feature, structure, characteristic, or function described in connection with the embodiment is included in at least some embodiments. The appearances of the phrase "in one embodiment" or "in an embodiment" in various places in the specification are not necessarily all referring to the same embodiment.

Figure 1:
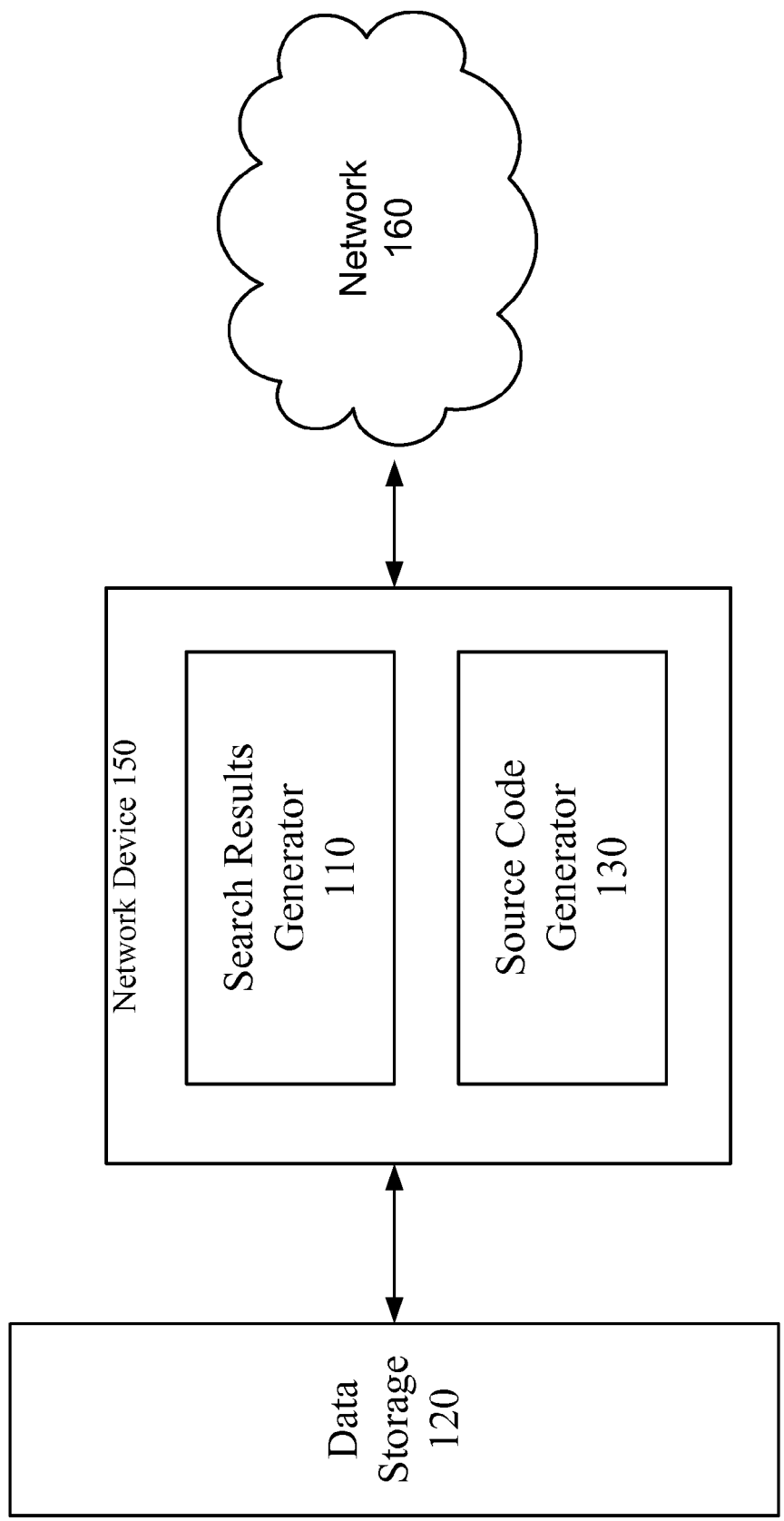
FIG. 1 illustrates a system for providing search results, capable of recording user clicks, to a user in response to a user query, in accordance with some embodiments.

FIG. 1 illustrates an embodiment of a system for providing search results to a user that enables the user's clicks to be monitored efficiently. The system includes a network device 150 coupled to a data storage device 120 and a network 160. In some embodiments, network device 150 is a search engine server. Examples of the network 160 may include small private networks, larger enterprise networks, the Internet, and combinations thereof. In some implementations, network device 150 includes one or more processors and memory storing programs for execution by the one or more processors. As described in more detail below, the programs include a search results generator 110 for identifying a plurality of websites relevant to a search query received by the network device 150, and a source code generator 130 for generating an ordered set of search results.

According to one embodiment, network device 150 receives a search query from a user through network 160. In response to this search query, the search results generator 110 identifies websites that are relevant to the user search query and communicates the results to source code generator 130. In one embodiment, the websites are identified by comparing the keywords from the search query to data stored in data storage 120. Data storage 120 contains data relating to websites that have previously been indexed. This data includes information that identifies the content of the particular website. Based on the comparisons, search results generator 110 determines which websites are relevant to the user search query and communicates the results to source code generator 130.

Source code generator 130 generates code that prioritizes these websites in order of their relevance to the search query. The code provides links to the websites and also enables the user's clicks to be recorded. Recording which websites a user clicks provides information that can be used as a factor in determining the priority of websites in future search results.

In one embodiment, source code generator 130 generates HTML code that includes hypertext links for each relevant website. Associated with each link is a function that initiates a data transfer in response to a predefined user action. According to one embodiment, when a user clicks down on a mouse button while their cursor is over a link, the function initiates a transfer of click recording data associated with the link to a server which logs the click recording data for later processing.

The click recording data transferred to the user may include a number of different types of data. For example, the data may include the URL of the link that was clicked by the user and/or the location of the link within the search result set. The click recording data may also include the time of the click or the original search query. This data may be analyzed to better improve subsequent presentation of search results to a user. For example, a website that is frequently clicked may be moved up in priority and displayed to a user higher up in the list of websites. Comparatively, a website that is clicked very infrequently may be moved down in the list.

Network device 150 communicates the search results generated by source code generator 130 to the user through network 160.

Figure 2:
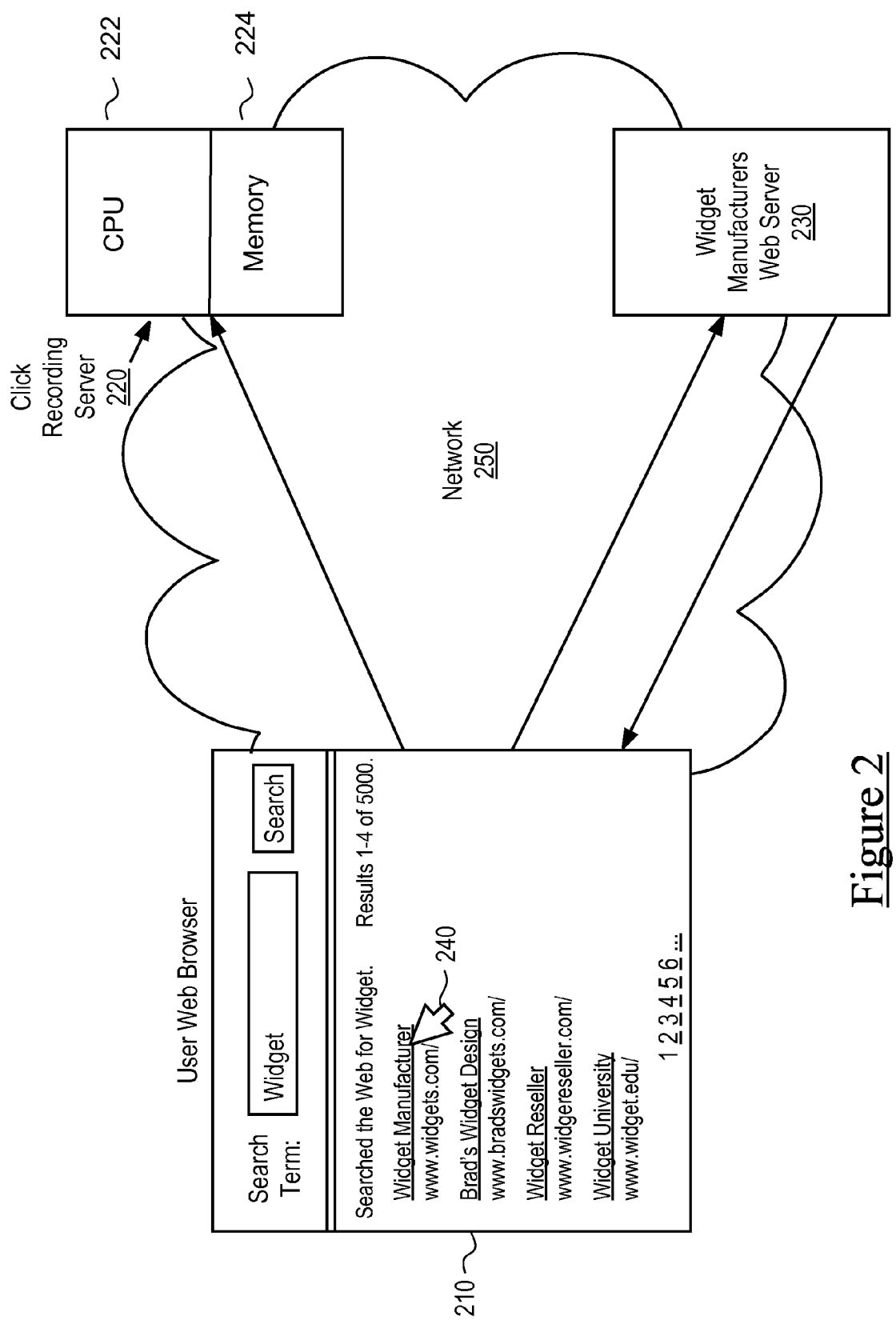
FIG. 2 illustrates a system for sending click recording data, in accordance with some embodiments.

FIG. 2 illustrates an embodiment of a system for recording user clicks. FIG. 2 illustrates a window 210, from a user's computer display, illustrating search results received from a search engine server in response to a search query. The user's computer is connected to network 250. FIG. 2 also includes two servers, click recording server 220 and web server 230, coupled to network 250. In some embodiments, click recording server 220 includes one or more processors 222 and computer readable storage 224 (e.g., memory devices or other computer readable storage media) storing programs for execution by the one or more processors. Examples of the network 250 may include small private networks, larger enterprise networks, the Internet, and combinations thereof.

In one embodiment, window 210 is a web browser that interprets the source code received from the search engine and displays the search results to the user. As illustrated, the relevant websites are listed one after another in window 210. Typically, the websites are listed in order of their relevance to the search query. The underlined text associated with each website is a link pointing to the website's address in network 250. In one embodiment, the link is a hypertext link generated in HTML code. Embedded within the HTML code is a function that detects a predefined user action and initiates a transfer of data to click recording server 220. In one embodiment, the predefined user action includes clicking down on a mouse button while a cursor is located over the link.

When the user clicks down on a mouse button while their cursor is over the link, the function associated with the link is triggered resulting in a transfer of click recording data to a server that is used to record click information. In the example illustrated in FIG. 2, the user has positioned cursor 240 over the link for Widget Manufacturer. When the user clicks down on a mouse button with cursor 240 located over this link, the function associated with the link is triggered and click recording data is sent to click recording server 220 through network 250. The click recording data may include the URL for the Widget Manufacturer website, www.widgets.com, the location of the link in the order of the search results, the time of the click, the original search query or any other data relevant to the link or the user click.

One skilled in the art will recognize that there are a number of ways to associate a function with the links. In some embodiments, a function is associated with each individual link returned to the user. In these embodiments, the function initiates the transfer of the click recording data when the user clicks on that particular link. In other embodiments, a single function can be associated with multiple links. In these other embodiments, when the user performs the predefined user action the function determines which link the user performed the predefined action over and sends the click recording data associated with that link to the click recording server.

Click recording server 220 receives the click recording data and logs the data for further processing. The log information can be parsed and processed to determine the number of clicks (or hits) to assign to a particular website. This information can be used as a factor when determining the priority of the website in response to a future query on the same or similar topic. As described above, websites that receive a large number of hits can be given greater priority and provided higher up in future search results, while websites that receive few hits can be given a lower priority.

When the user completes the click by releasing the mouse button with the cursor still positioned over the link, a request is sent to the URL associated with the link, requesting the website. In the example illustrated in FIG. 2, a request for the Widget Manufacturer website is sent through network 250 to the Widget Manufacturer Web Server 230. When server 230 receives the request, it responds by sending data associated with the website through network 250 to the user's computer. The browser on the user's computer interprets the received data and displays the website to the user through window 210.

According to some embodiments, latency that may be introduced by sending the click recording data may be reduced or hidden within the duration of the user click so that recording a user click may result in little or zero delay perceived by the user. The click recording data is sent separate from the request for the data associated with the link. As described above, the click recording data is sent on the down click of the mouse button during a user click. By contrast, the request for the data associated with the link is not sent until the user completes the click by releasing the mouse button. During the time interval between the down click of the mouse button and the release of the mouse button, at least part of the click recording data may be sent to the recording server. Sending the click recording data during this interval can reduce the latency that is added to latency from the request for the data associated with the link. The user-perceived latency due to the click recording may even be eliminated altogether if the sending of the click recording data is completed prior to the completion of the click.

A typical user click takes approximately 60 milliseconds (ms) to complete from the time the mouse button is depressed until the mouse button is released. By contrast and depending on the browser, some implementations use approximately 40 ms to send the click recording data. In this situation, the click recording data may be sent to the click recording server before the user completes the click. As a result, the transfer of the click recording data occurs without any noticeable latency to the user. The user will not even be aware that the click recording data is being sent since it will not add any latency to the request for the data associated with the link.

In some alternative embodiments, additional code is included to monitor for the situation when a user clicks down on a mouse button while their cursor is located over the link but moves the cursor off of the link before completing the click by releasing the mouse button. When this occurs, click recording data associated with the link is sent even though the user did not actually click on the link. As a result, this situation leads to inaccurate click recording data. This problem can be resolved by sending a disregard message to click recording server 220 when this situation occurs. For example, if the user clicks down on a mouse button while their cursor is over a link, resulting in click recording data being sent to click recording server 220, but then moves the cursor off of the link before releasing the button, a request is generated and sent to click recording server 220 notifying the server to ignore the previous click recording data.

As discussed above, the click recording data can include a number of different parameters, including the URL of the link, the position of the particular link in the search results, the time of the click, the original search query, or combinations thereof. In some other embodiments, a token is included as part of the click recording data to prevent click spam. Click spam occurs when a user clicks on a link or writes a program to simulate clicking on a link multiple times to increase the number of hits attributed to that website. This is often done to falsely inflate the importance of a particular website. By including a token in the click recording data, click spamming can be detected and the duplicate hits from the same user or program can be removed from the click recording logs.

In one embodiment, a token is included in the web page returned to the user. When the function initiates the transfer of click recording data in response to the predefined user action, the token is included as part of the click recording data sent to the click recording server. The token may be used to uniquely identify the search performed, the results or the time of result generation. When the token is received with the click data, the token may be used to verify that the received token has not previously been received and that the token is valid in the context of the search being performed. In an alternative embodiment, JavaScript code is included with the search results to generate and append a token to the click recording data. This embodiment ensures that the click recording data originates from a web browser rather than a program designed to fake clicks. Click recording data that does not include a valid token may be disregarded by the click recording server or may be ignored when the click recording data is processed.

One skilled in the art will recognize that there are a number of functions that can be used to initiate the transfer of the click recording data in response to the predefined user action. In one embodiment, a JavaScript Image request is used as the function for transmitting the click recording data to a server used for recording clicks. In this embodiment, JavaScript code is included in the HTML code used to define each link of the search results page. For the example described above in FIG. 3, the HTML code would appear as:

<a href="http://www.widgets.com/"
onmousedown="link_clicked(1, this.href); return true;">
Widget Manufacturer
</a>

Figure 3:
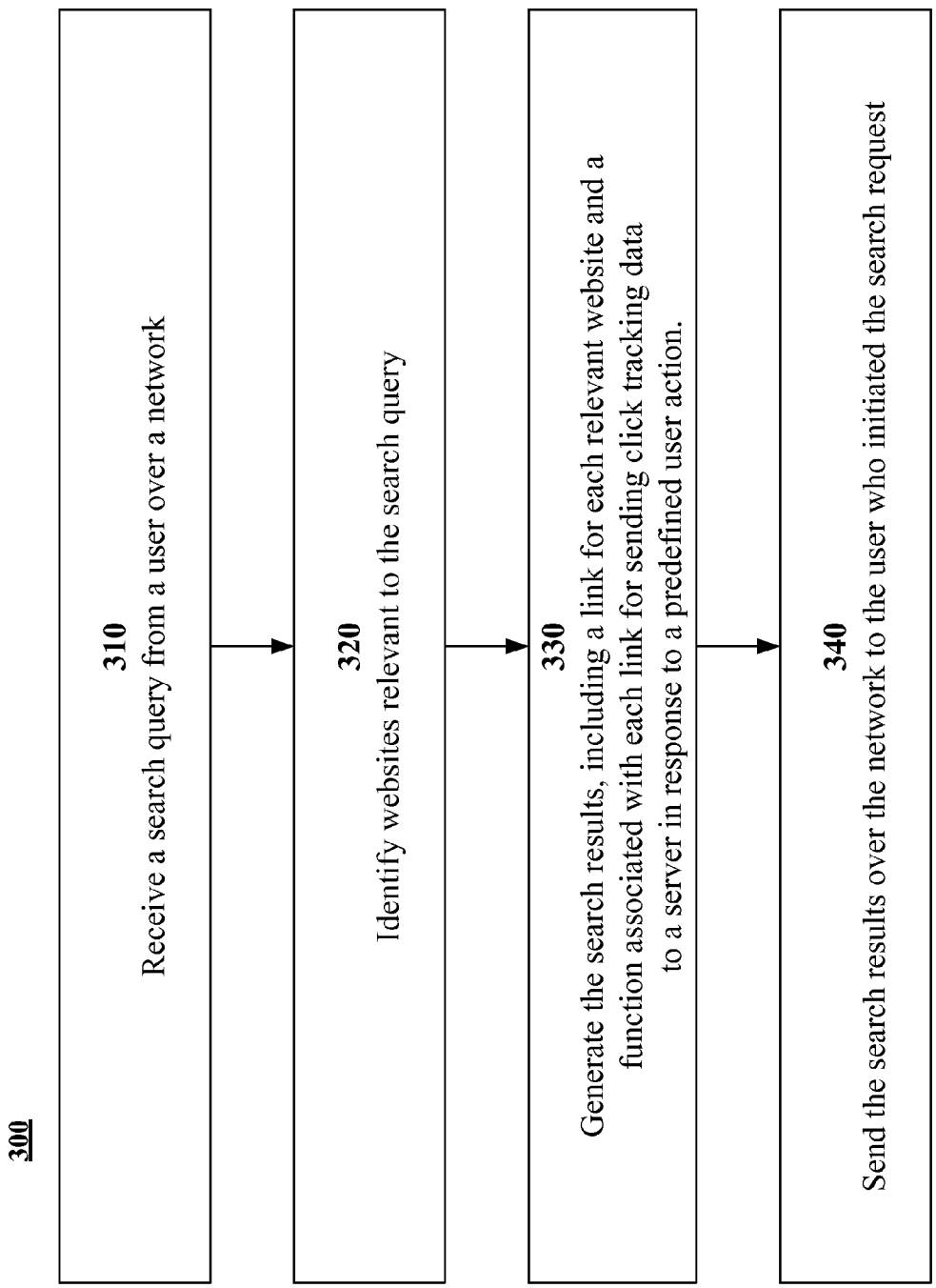
FIG. 3 illustrates a method for providing search results, capable of recording user clicks, to a user in response to a search query, in accordance with some embodiments.

When interpreted by a web browser, this code displays the link Widget Manufacturer as illustrated in FIG. 3. This link points to the URL, www.widgets.com as defined in the HTML code.

The onmousedown code is a JavaScript event handler that calls a function called link_clicked when the user depresses a mouse button with the cursor over the Widget Manufacturer link. In some embodiments, the link_clicked function consists of the following JavaScript code:

function link_clicked(link_number, link_url){
var clickDataUrl="/record_click_data";
clickDataUrl+="?link_number="+link_number;
clickDataUrl+="&link_url="+escape(link_url);
var imageObject=new Image( );
imageObject.src=clickDataUrl;
}

The link_clicked function takes in two parameters, link_number and link_url. The link number parameter represents the position of the link in the order of the links in the search results. In this example, the link for Widget Manufacturer is the first link in the search results, so n is equal to 1. The second parameter passed to the link_clicked function is the URL of the link being clicked upon. In the embodiment described, "this" is a JavaScript Link Object that maps to the anchor tag of the link that was clicked upon. The anchor tag includes the URL of the link.

The link_clicked function creates a new Image Object and sets the source of the Image Object to a predefined URL of the server used to record the click data (the click recording server). In this embodiment, the URL assigned to the source of the Image object is the clickDataUrl variable. As illustrated above in the code for the link_clicked function, the clickDataUrl comprises the URL of the click recording server, /record_click_data, appended with the link number and the URL of the link being clicked upon. In the embodiment described above, this results in the following URL assigned to the clickDataUrl:

/record_click_data?link_number=1&link_url=http %3A// www.widgets.com

When the link_clicked function creates the new Image object with this URL as the source, a request for the Image Object is sent to the click recording server located at the predefined URL, /record_click_data. As illustrated above, the URL contains parameters identifying the URL of the link that was clicked upon and the position of link within the order of the search results.

The click recording server receives the Image request and logs the click recording data, including the result number and the URL of the clicked upon link, for later processing. The server then generates an optional No Content response which is sent back to the user's browser. This No Content response informs the browser that no image data is forthcoming.

As discussed above, a typical user click takes approximately 60 ms to complete from the time the mouse button is depressed until the mouse button is released. By comparison, the described-above JavaScript Image request, implemented in some embodiments, takes approximately 40 ms, depending on the browser. Thus, the click recording data may be transmitted before the user completes the click by releasing the mouse button. In this situation, no additional latency is introduced to the request for the data associated with link. However, even if the Image request took longer than the user click, the latency introduced by the sending the click recording data could at least partially be hidden within the user click, thus reducing the latency experienced by the user.

One skilled in the art will recognize that the present invention is not limited to recording information relating to user clicks and may be expanded to record information relating to a variety of user actions. In one embodiment, code may be embedded within a document, such as a web page, to monitor for predefined user navigations within a web page and send data associated with the user navigation to a recording server. In one embodiment, the code detects when a user uses the browser's scroll bar to scroll within the web page. When this occurs, the code detects the navigation and initiates a transfer of data to the recording server. This data identifies the predefined user navigation that has occurred. In this embodiment, the data indicates that the user scrolled down in the page of search results.

In another embodiment, code within the webpage may be used detect which portion of a webpage a user positions a cursor over, referred to as a "mouse over". When the user mouses over a particular portion of the webpage, data identifying the portion of the page may be transferred to the recording server. This data may include data identifying the object or contents located at that portion of the page and/or the position of the cursor within the page. For example, if the user mouses over a link within the page, data identifying the link, including the URL associated with the link and/or the position of the link within the page, may be transmitted to the recording server. In an alternative embodiment, data relating to the mouse over is transmitted when the cursor has been positioned over the portion of the web page for a predetermined amount of time.

It should be noted that various embodiments of the present invention are not limited to using the JavaScript Image function described above. One skilled in the art will recognize that there are a number of other programming languages, functions and JavaScript objects that can be used to implement the various embodiments of the invention.

FIG. 3 illustrates a method 300 for providing search results to a user that enable the user's clicks to be more efficiently monitored. In Step 310, a search query is received from a user over a network, such as the Internet. In Step 320, websites relevant to the search query are identified. Keywords from the search query are compared with data associated with various websites to determine websites which are relevant to the search query. Typically, the data associated with the various websites is gathered by a webcrawler which searches the Internet for websites and stores data relevant to the content of the website.

In step 330, the search results are generated, including a link for each relevant website and a function associated with each link for sending click recording data to a server in response to a predefined user action. In one embodiment, the search results are generated in HTML code. Code for displaying a hypertext link for each website is provided along with a function embedded within the hypertext code. The function sends click recording data to a server responsible for recording the data when a user performs a predefined action. In one embodiment, the predefined action occurs when the user clicks down on a mouse button while a cursor is located over the link.

In step 340, the generated search results are sent over the network to the user who initiated the request.

Figure 4:
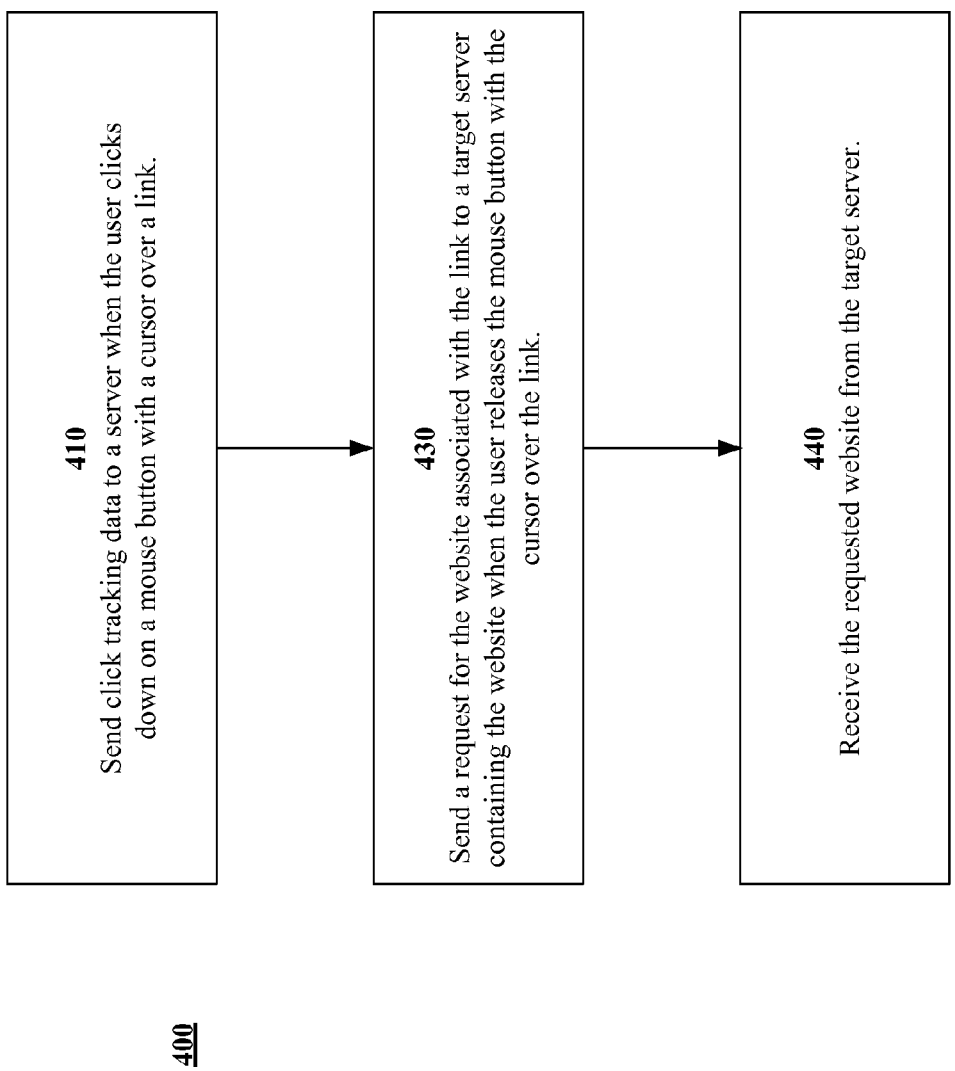
FIG. 4 illustrates a method for recording user clicks when a user clicks on a link in a web browser, in accordance with some embodiments.

FIG. 4 illustrates a method 400 for requesting a website associated with a link and sending click recording data associated with the link to a server when a user clicks on a link.

In step 410, when a user clicks down on a mouse button while their cursor is over the link, a function associated with the link is triggered resulting in a transfer of click recording data to a server used to record click information. In one embodiment, the click recording data includes the URL of the link. In another embodiment, the click recording data includes the position of the link in the order of the search results.

In step 430, when the user completes the click by releasing the mouse button with the cursor still positioned over the link, a request is sent to a target server associated with the link, requesting the website. Typically, the link includes a URL that defines the location of the website within a network. When the user clicks on the link, a request is sent to the server located at the URL requesting the target website.

In step 440, the user receives the requested website from the target server. The target server responds to the user request in 430 with the requested website information.

While various embodiments have been described with reference to a mouse input device, there are a number of other user input devices that can be used. For example, a touchpad, rollerball or other input device could be used to provide the same results described above.

While various embodiments have been described, those skilled in the art will recognize that various modifications may be provided. For example, the present invention is not limited to recording click information in search results. One skilled in the art will recognize that the present invention can be used to record a user click from any link, including a static list of links. In addition, there are a number of variations of click recording data that can be sent to a click recording server according to the present invention. Variations upon and modifications to the embodiments are provided for by the present invention, which is limited only by the following claims.

What is claimed is:

1. A method for providing search results to a user in response to a search query, the method comprising:
   identifying a plurality of websites relevant to the search query;
   generating the search results including an ordered set of search results and a client-executable recording function, wherein:
      each respective search result in the ordered set of search results includes a link to a respective website of the identified plurality of websites, the link including:
         a reference to the client-executable recording function that is distinct from a function of the link to send a request to the respective website and that is executable at a client device when the user performs a predefined action with respect to the link, and
         position information identifying a position of the respective search result in the ordered set of search results; and
      the client-executable recording function, when executed at the client device, sends data, including the position information and website location information associated with the link in a respective search result of the ordered set of search results, to a server that is distinct from the website; and
   sending the search results, including the ordered set of search results and the client-executable recording function, to the client device.

2. The method of claim 1, wherein the data includes a Universal Resource Locator (URL) of the link.

3. The method of claim 1, wherein the predefined action is distinct from another link action performed by the user to send the request to the respective website.

4. The method of claim 3, wherein a request for the website associated with the link is transmitted when the user releases a mouse button with a cursor over the link.

5. The method of claim 1, wherein the recording function comprises a JavaScript Image request with a source of the JavaScript Image set to a Universal Resource Locator (URL) of the server.

6. An apparatus for generating search results in response to a search query, comprising:
   one or more processors;
   memory storing programs for execution by the one or more processors, the programs including:
      a search results generator for identifying a plurality of websites relevant to the search query; and
      a source code generator for generating an ordered set of search results, each search result including an ordered set of search results and a client-executable recording function, wherein:
         each respective search result in the ordered set of search results includes a link to a respective website of the identified plurality of websites, the link including:
            a reference to the client-executable recording function that is distinct from a function of the link to send a request to the respective website and that is executable at a client device when the user performs a predefined action with respect to the link, and
            position information identifying a position of the respective search result in the ordered set of search results; and
         the client-executable recording function, when executed at the client device, sends data, including the position information and website location information associated with the link in a respective search result of the ordered set of search results, to a server that is distinct from the website; and
      a search result sender for sending the search results, including the ordered set of search results and the client-executable recording function, to the client device.

7. The apparatus of claim 6, wherein the data includes a Universal Resource Locator (URL) of the link.

8. The apparatus of claim 6, wherein the predefined action is distinct from another link action performed by the user to send the request to the respective website.

9. The apparatus of claim 8, wherein a request for the website associated with the link is transmitted when the user releases a mouse button with a cursor over the link.

10. The apparatus of claim 6, wherein the recording function comprises a JavaScript Image request with a source of the JavaScript Image set to a Universal Resource Locator (URL) of the server.

11. A non-transitory computer readable storage medium storing programs for execution by one or more processors of a server computer, the programs comprising computer instructions for:
   identifying a plurality of websites relevant to the search query;
   generating search results including an ordered set of search results and a client-executable recording function, wherein:
      each respective search result in the ordered set of search results includes a link to a respective website of the identified plurality of websites, the link including:
         a reference to the client-executable recording function that is distinct from a function of the link to send a request to the respective website and that is executable at a client device when the user performs a predefined action with respect to the link, and
         position information identifying a position of the respective search result in the ordered set of search results; and
      the client-executable recording function, when executed at the client device, sends data, including the position information and website location information associated with the link in a respective search result of the ordered set of search results, to a server that is distinct from the website; and
   sending the search results, including the ordered set of search results and the client-executable recording function, to the client device.

12. The computer readable storage medium of claim 11, wherein the data includes a Universal Resource Locator (URL) of the link.

13. The computer readable storage medium of claim 11, wherein the predefined action is distinct from another link action performed by the user to send the request to the respective website.

14. The computer readable storage medium of claim 13, wherein a request for the website associated with the link is transmitted when the user releases a mouse button with a cursor over the link.

15. The computer readable storage medium of claim 11, wherein the recording function comprises a JavaScript Image request with a source of the JavaScript Image set to a Universal Resource Locator (URL) of the server.

\* \* \* \* \*